(12) United States Patent
Smith

(10) Patent No.: US 11,654,820 B1
(45) Date of Patent: May 23, 2023

(54) LATERALLY EXTENDING BACKUP LIGHT FOR VEHICLE

(71) Applicant: James C. Smith, Carthage, MS (US)

(72) Inventor: James C. Smith, Carthage, MS (US)

(*) Notice: Subject to any disclaimer, the term of this patent is extended or adjusted under 35 U.S.C. 154(b) by 0 days.

(21) Appl. No.: 17/736,697

(22) Filed: May 4, 2022

(51) Int. Cl.
*B60Q 1/22* (2006.01)
*B60Q 1/26* (2006.01)

(52) U.S. Cl.
CPC ............. *B60Q 1/22* (2013.01); *B60Q 1/2692* (2013.01)

(58) Field of Classification Search
CPC ................................ B60Q 1/22; B60Q 1/2692
See application file for complete search history.

(56) References Cited

U.S. PATENT DOCUMENTS

| | | | | |
|---|---|---|---|---|
| 2,170,370 A * | 8/1939 | Jacobus | .................... | B60Q 1/34 340/484 |
| 3,783,267 A * | 1/1974 | Thomas | .................... | B60P 3/18 362/523 |
| 4,825,192 A * | 4/1989 | Wells | ........................ | B60R 19/38 280/765.1 |
| 4,855,878 A * | 8/1989 | Vu | ............................ | B60Q 1/22 362/802 |
| 4,894,755 A * | 1/1990 | Chandler | ............. | B60Q 1/2692 362/523 |
| 5,038,136 A * | 8/1991 | Watson | .................... | B60Q 1/50 340/487 |
| 5,281,948 A * | 1/1994 | Estrada | .................... | B60Q 1/50 340/488 |
| 5,406,250 A * | 4/1995 | Reavell | .................... | B60Q 1/50 318/434 |
| 5,696,484 A * | 12/1997 | Kim | ...................... | B60Q 1/2692 340/471 |
| 5,743,635 A * | 4/1998 | Hulse | ..................... | E04H 12/182 362/385 |
| 6,009,650 A * | 1/2000 | Lamparter | ............... | B60Q 1/50 362/478 |
| 6,213,047 B1 * | 4/2001 | Means | ................. | B60Q 1/2657 116/28 R |
| 6,260,990 B1 | 7/2001 | Saunders | | |
| 6,409,367 B1 | 6/2002 | Pratt | | |
| 6,825,760 B2 * | 11/2004 | Sawyer | .................. | B60K 28/02 116/28 R |
| 6,923,564 B2 * | 8/2005 | Steward | ................... | B60Q 1/05 296/180.1 |

(Continued)

FOREIGN PATENT DOCUMENTS

EP          3351429 A1        1/2018

*Primary Examiner* — Arman B Fallahkhair
(74) *Attorney, Agent, or Firm* — George L. Williamson

(57) ABSTRACT

Method and apparatus for a laterally extendable backup light system for placement on the trailer of the 18-wheeler tractor trailer truck. The backup light would be mounted underneath an outer edge of the trailer of the tractor-trailer so that it would be extendable laterally away from the edge of the trailer so that the light portion would extend far enough outwardly to travel beyond the outer edge of the trailer so that the beam of light emanating therefrom would illuminate the area behind the rear of the trailer. A linear actuator controlled wirelessly or via hardwire by the driver of the truck would actuate the light portion of the device so that the light portion would extend from an enclosure beyond the edge of the trailer of the truck-trailer or would be retracted back into the enclosure.

20 Claims, 3 Drawing Sheets

(56) References Cited

U.S. PATENT DOCUMENTS

| | | | | |
|---|---|---|---|---|
| 7,008,088 B2* | 3/2006 | Pisciotti | ................. | B60Q 1/305 |
| | | | | 362/549 |
| 7,791,464 B1* | 9/2010 | Giddings | ............... | B60Q 1/305 |
| | | | | 340/471 |
| 9,849,825 B2* | 12/2017 | Salami, Jr. | ........... | B60Q 1/0035 |
| 10,703,266 B1* | 7/2020 | Butler | .................... | E01F 9/662 |
| 11,041,610 B1* | 6/2021 | Smith | ..................... | F21V 21/30 |
| 2003/0063475 A1 | 4/2003 | Simmons | | |
| 2008/0206030 A1* | 8/2008 | Reuille | .................... | B60P 3/07 |
| | | | | 254/362 |
| 2014/0016337 A1* | 1/2014 | Younger | ................ | B60Q 1/22 |
| | | | | 362/485 |
| 2016/0347247 A1* | 12/2016 | Espey | ..................... | B60Q 1/52 |
| 2017/0259730 A1* | 9/2017 | Carroll | .................... | B60P 3/18 |

* cited by examiner

LATERALLY EXTENDING BACKUP LIGHT FOR VEHICLE

BACKGROUND OF THE INVENTION

Field of the Invention

The present invention relates generally to appurtenances for vehicles, and more particularly, is concerned with a backup light for placement on the trailer of an 18-wheeler type tractor trailer truck.

Description of the Related Art

Devices relevant to the present invention have been described in the related art; however, none of the related art devices disclose the unique features of the present invention. In U.S. Patent Application Publication No. 2016/0347247 dated Dec. 1, 2016, Espey, et al., disclosed a vehicle mountable safety light system. In United States Patent Application Publication No. 2003/0063475 dated Apr. 3, 2003, Simmons disclosed a retractable and concealable rearward light system for a vehicle. In U.S. Pat. No. 6,923,564 dated Aug. 2, 2005, Steward disclosed a selectively deployable driving lights. In U.S. Pat. No. 6,260,990 dated Jul. 17, 2001, Saunders disclosed truck lights. In U.S. Pat. No. 6,409,367 dated Jun. 25, 2002, Pratt disclosed a rear mounted vehicle lighting system. In European Patent Application No. EP 3351429A1 dated Jan. 23, 2018, Tagliatti disclosed foldable position lights. In U.S. Pat. No. 11,041,610 dated Jun. 22, 2021, Smith disclosed a laterally extending backup light for a trailer of a truck which was air operated and had many more components and which was much more complicated than the present invention.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a laterally extendable backup light system for placement on the trailer of the 18-wheeler tractor trailer truck. The lights of the present invention would be mounted underneath an outer edge of the trailer of the tractor-trailer so that they would be extendable laterally away from the edge of the trailer so that the light portion of the present invention would extend far enough outwardly to travel beyond the outer edge of the trailer so that the beam of light emanating therefrom would illuminate the area behind the rear of the trailer. A linear actuator operated by an electrical switch/actuator controlled by the driver of the truck would actuate the light portion of the present invention so that the light portion would extend from an enclosure of the present invention so that the light would extend beyond the edge of the trailer of the truck-trailer when the transmission is placed in reverse and then the light portion would be retracted back into the enclosure by an electrical switch/actuator when the transmission is taken out of reverse.

An object of the present invention is to provide a backup light system for use on a tractor-trailer truck. A further object of the present invention is to provide a laterally extendable back up light system which extends far enough beyond the edge of the trailer to illuminate the rear area behind the tractor-trailer truck. A further object of the present invention is to provide a backup light for a trailer which can be easily operated by a user. A further object of the present invention is to provide a backup light system for a trailer which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
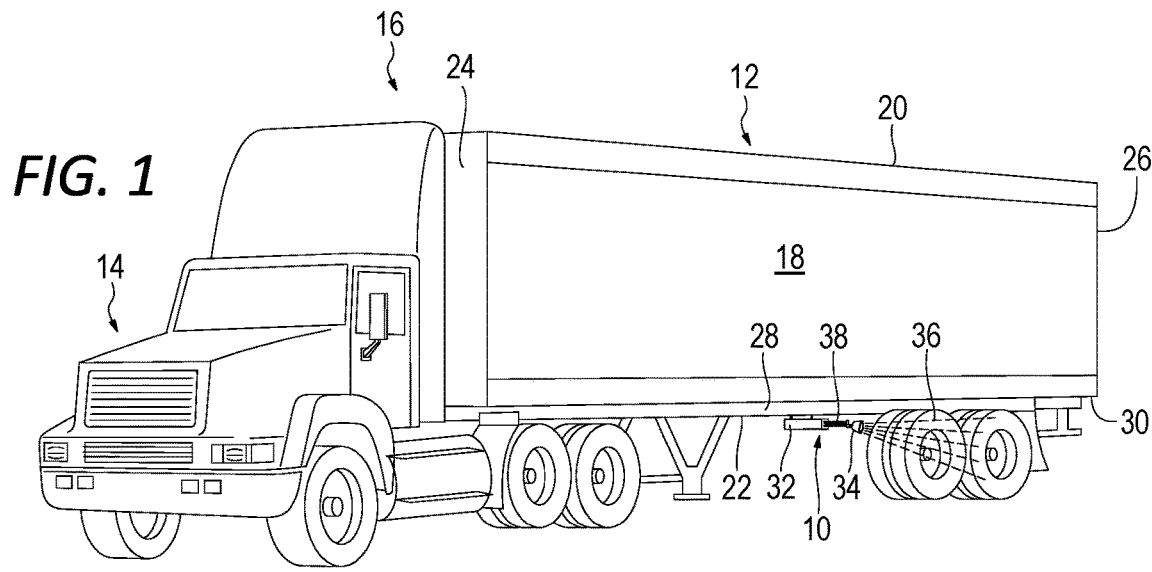
FIG. 1 is a perspective view of the present invention shown in operative connection.

With regard to reference numerals used, the following numbering is used throughout the drawings.

10 present invention
12 trailer
14 tractor
16 tractor trailer/semi tractor-trailer truck
18 side
20 top
22 bottom
24 front
26 rear
28 frame member
30 underside
32 housing/enclosure
34 light portion
36 light beam
38 shaft
40 mounting bolts
42 electrical power supply/battery
43 controller box
44 transceiver
46 base
48 pivot
50 linear actuator
52 drive motor
54 drive shaft
56 gear assembly 58 drive shaft
60 ball screw
61 cover
62 threads
63 ball nut
64 remote control/fob
66 switch
68 electrical wiring harness
70 electrical wiring harness
72 electrical conduit
80 backup lights on
82 backup lights off
84 light extends from enclosure
86 light retracts into enclosure

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 5 illustrate the present invention wherein a laterally extending backup light system for a tractor-trailer truck is disclosed and which is generally indicated by reference number 10.

Turning to FIG. 1, therein is shown the present invention 10 disposed on a trailer 12 behind the tractor 14 of the tractor-trailer truck 16 attached to the side 18 of the trailer wherein the trailer 12 has a side 18, a top 20, a bottom 22, a front 24 and a rear 26 wherein the present invention 10 is connected to any suitable frame member 28 underneath 30 the trailer 12 of the tractor-trailer truck 16. It can be seen that the present invention 10 has a housing 32 and a light portion 34 extending from the enclosure so that the light portion shines a light beam 36 toward the rear 26 of the trailer 12 of the tractor-trailer 16. The light portion 34 of the present invention 10 is mounted on a shaft 38 which extends from the enclosure 32 of the present invention 10. While FIG. 1 shows only the driver side of the tractor trailer 16, the present invention 10 may be mounted on both the driver and passenger side of the tractor trailer. The present invention 10 may also be used on other type trucks, e.g., a straight truck or bus, which has no trailer.

Figure 2:
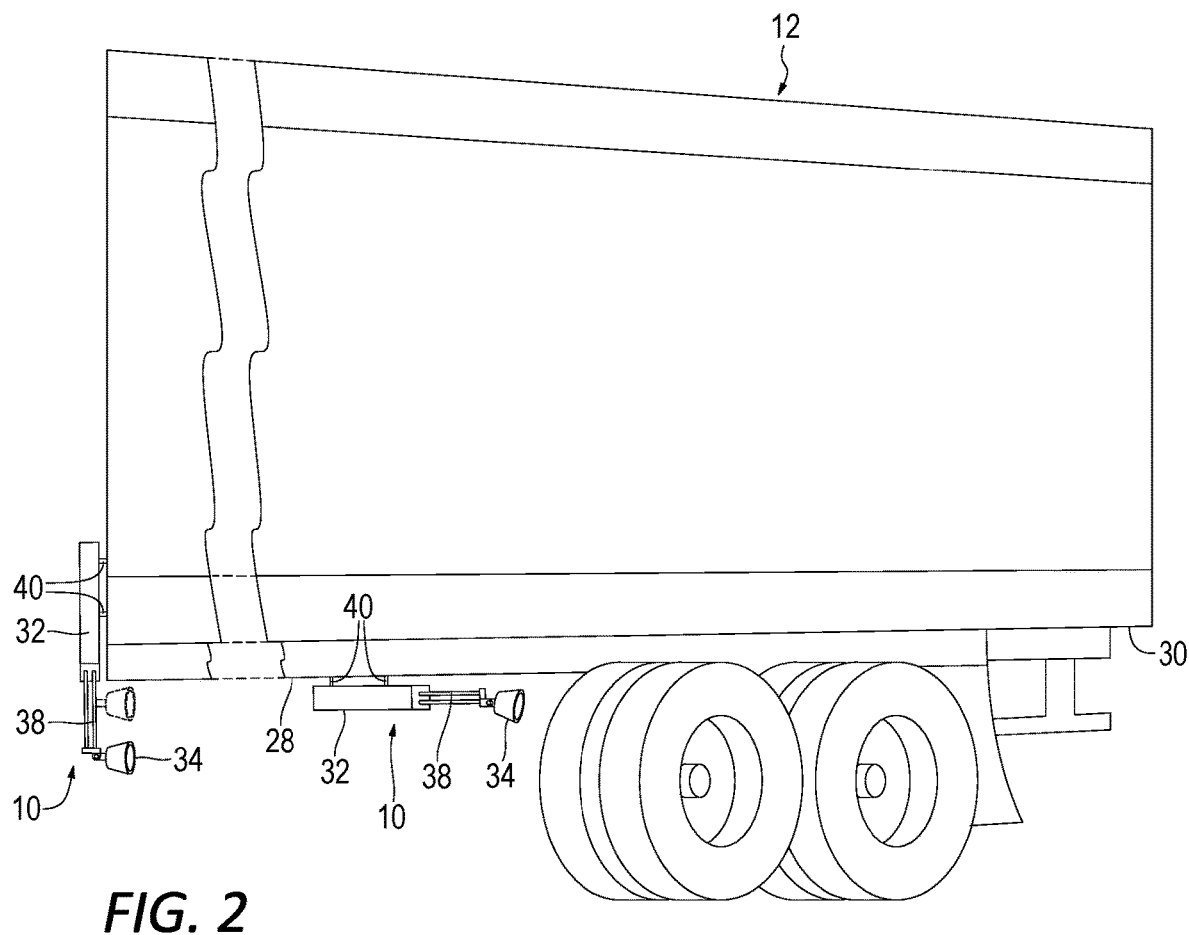
FIG. 2 is a perspective view of the present invention shown in operative connection.

Turning to FIG. 2, therein is shown the present invention 10 mounted on the underside 30 of the trailer 12 having an enclosure 32 which is attached to a frame 28 of the trailer 12 using a plurality of mounting bolts 40 or the like as described relative to FIG. 1. Also, shown is the present invention 10 alternatively mounted vertically on trailer 12 showing the light 34 in an extended and a retracted position along with other previously disclosed features.

Figure 3:
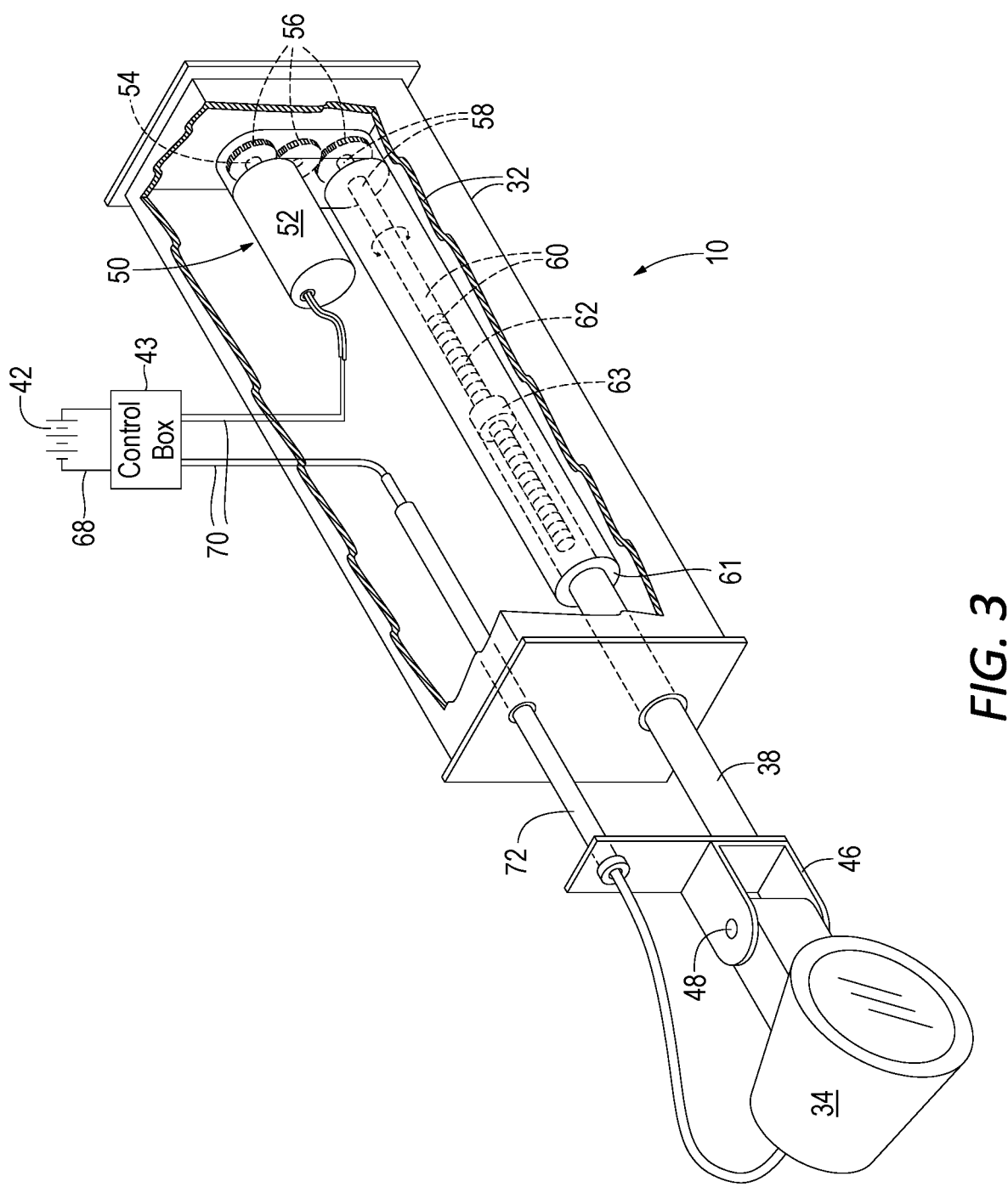
FIG. 3 is a perspective view of the light portion of the present invention being extended from the housing.

Turning to FIG. 3, the present invention 10 operates on a conventional 12-volt electrical system which is expected to be supplied by the vehicle electrical power supply 42, e.g., a battery. Electrical power from the truck/tractor 14 electrical power supply 42 is supplied to a control box 43 through electrical wiring harness 68; and, to the light portion 34 through electrical wiring harness 70. The present invention 10 includes an enclosure 32 containing the light portion 34 which light is mounted on an adjustable base 46 so that the light pivots angularly at 48 wherein base 46 mounts onto a shaft 38 which extends from and retracts into an enclosure 32. Shaft 38 is extended and retracted into the housing 32 by means of a linear actuator generally indicated by reference number 50 including a drive motor 52 having a rotating output drive shaft 54 with a set of gears forming a gear assembly 56 in a gear box or enclosure wherein one of the gears has another rotating output drive shaft 58 wherein the drive shaft 58 is mechanically coupled to a threaded ball screw/spindle 60 having a set of threads 62 thereon which threads 62 are interconnected to mating threads on a ball nut 63 so that as the threaded ball screw/spindle 60 is rotated by the drive motor 52 the ball nut 63 moves linearly along the screw/spindle 60. Ball nut 63 is interlocked to the cover 61 or enclosure 32 to prevent its rotation so that the shaft 38 moves linearly along the enclosure 32 as the threaded ball screw/spindle 60 rotates and thereby extends and retracts the light 34 into and out of the enclosure 32 in response to the rotation of motor 52 in either a clockwise or a counterclockwise direction.

The base 46 of light portion 34 also has an extendable/retractable stabilizing electrical conduit shaft 72 which encloses the electrical wires 70 and helps weatherproof the waterproof enclosure 32.

A light portion 34 is mounted to the enclosure/housing 32 so that it will emit light to the rear 26 of the trailer 12 when the light portion 34 is turned on. The light portion 34 could comprise any type of light emitting device including incandescent, fluorescent or light emitting diodes as would be done in the standard manner by one skilled in the art. It is expected that the present invention 10 should be mounted in front of the rear tandem wheels of the trailer 12 or in front of the drive axle of a straight truck.

The control box 43 of the present invention 10 can receive input data by either hardwire or wirelessly. If the present invention 10 is controlled wirelessly, a transceiver 44 would be required to be connected to the control box 43 so as to receive input transmission data from a manually operated remote control handheld device 64, such as, e.g., a fob as is commonly used with remote control door systems of automobiles. Alternatively, the present invention 10 can be controlled via hardwire by a manually operated switch 66 mounted at a convenient location in the cab of the truck tractor 14 pursuant to a user selectable location according to the wishes of the designer. The fob 64 would be a remote control wireless device being portable in nature and would be handheld having an internal battery and would be expected to have, for example, a first open button which would turn on and extend the light 34 from enclosure 32 and a second close button which would turn off and retract the light back into the enclosure.

Figure 4:
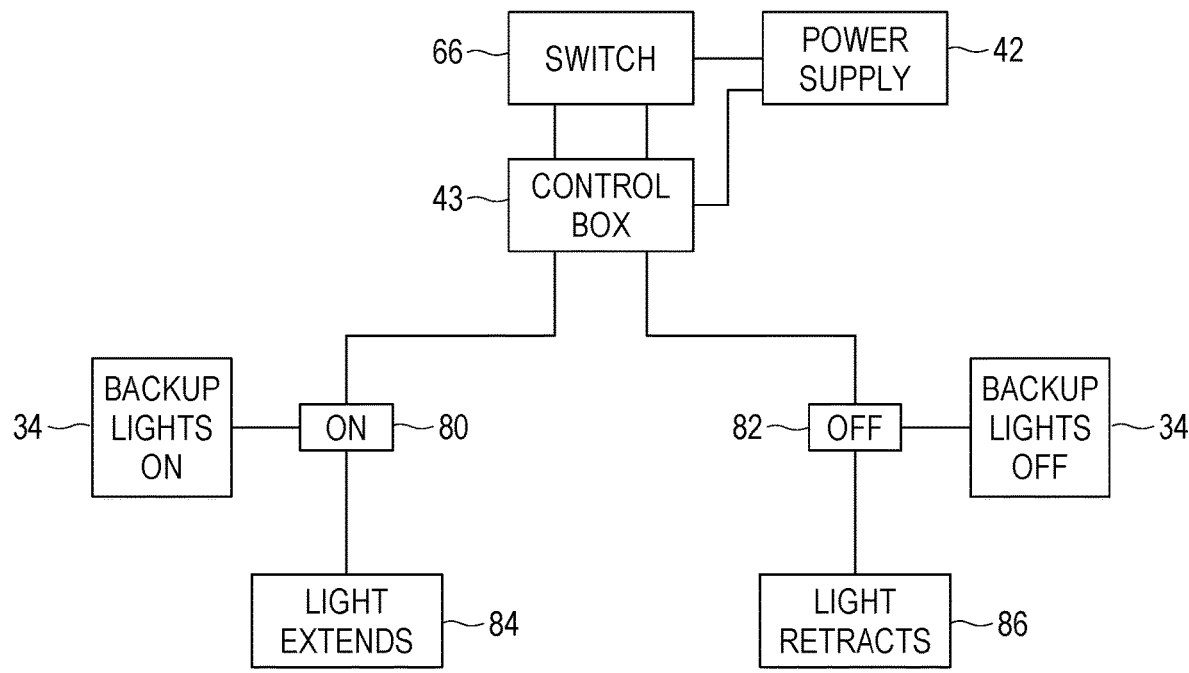
FIG. 4 is an electrical flow diagram of one embodiment of the present invention.

Turning to FIG. 4, therein is shown an electrical flow diagram for an embodiment wherein the present invention 10 is controlled via hardwire which includes the battery 42 of the tractor-trailer 16, the switch 66, so that the present invention 10 and backup light 34 (this includes light portion 34 shown in FIG. 3) come on when the switch is turned on as indicated at 80 and the light extends at 84 from enclosure 32. When the switch 66 is turned off, the backup lights 34 are turned off as indicated at 82 and retracted at 86 into enclosure 32.

Figure 5:
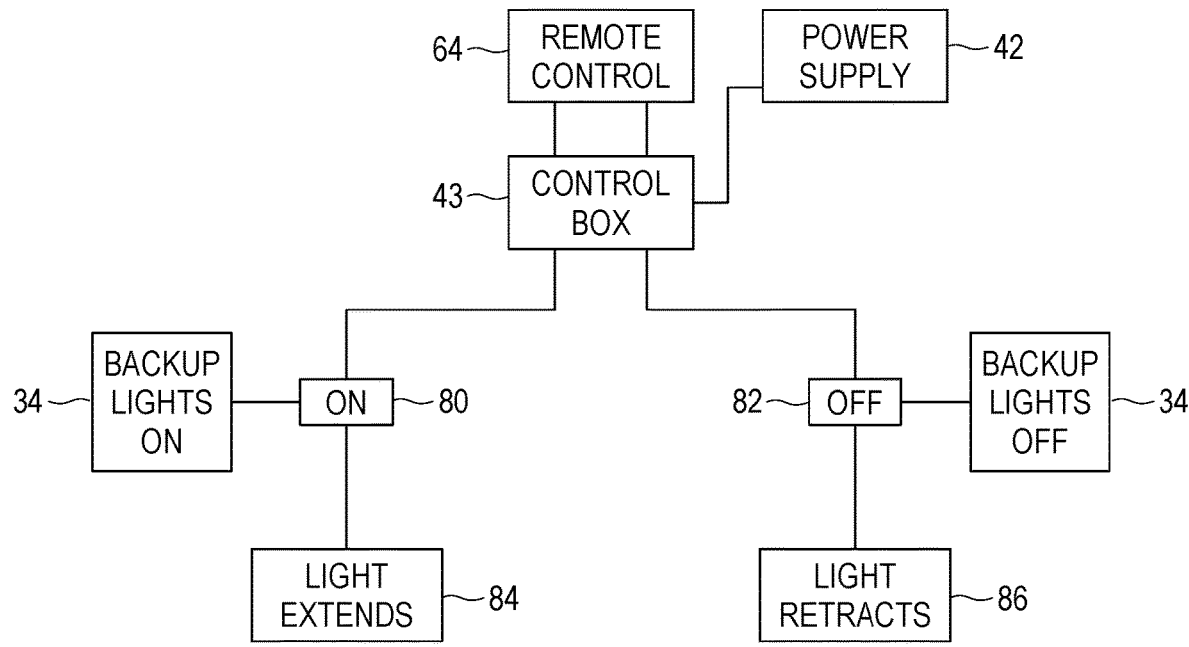
FIG. 5 is an electrical flow diagram of a second embodiment of the present invention.

Turning to FIG. 5, therein is shown an electrical flow diagram for an embodiment wherein the present invention 10 is controlled wirelessly which includes a wireless remote control 64 so that the present invention 10 and backup light 34 (this includes light portion 34 shown in FIG. 3) come on when the switch is turned on as indicated at 80 and the light extends at 84 from enclosure 32. When the remote control 64 is turned off at 82, the backup lights 34 are turned off as indicated at 82 and retracted at 86 into enclosure 32.

By way of general explanation and by making reference to FIGS. 1-5, a linear actuator 50 is an actuator that creates a straight line motion in response to a rotating shaft from a conventional electric motor 52. Generally speaking, the electric motor 52 of a linear actuator is mechanically coupled to a rotating threaded screw 60 wherein the threaded screw has continuous helical threads 62 machined onto its circumference running along the length of the threaded screw. Threaded onto the threaded screw 60 is a ball nut 63 having mating corresponding helical threads wherein the ball nut is prevented from rotating with the threaded screw by having the ball nut be interlocked with a non-rotating part of the actuator body, e.g., enclosure 32. Therefore, when the rotating screw 60 is rotated, the ball nut 63 will be driven linearly along the threads 62 of the rotating screw. The direction of movement of the ball nut 63 will be determined by the direction of rotation of the threaded ballscrew 60. Many types of motors 52 can be used with a linear actuator system including DC motors of all types, stepper motors reversible motors, and any other suitable motor electrical motor.

The remote control 64 of the present invention 10 operates on radio frequency or the like wave technology so line of sight is not required for operation and its mode of motion control is expected to use either momentary or sustaining operation, wherein momentary operation means the actuator would only move while a button on the remote control was held down so as to provide accuracy in control, or, sustaining operation which means one press of a directional button on the remote control assures that the actuator will move all the way to the end of its stroke in the direction that the operator presses and due to integration of an internal limit switch in the actuator, no further action is required once the actuator reaches the end of its stroke.

I claim:

1. A laterally extending backup light system for a vehicle, comprising:
   a) a laterally extending first housing mounted underneath an outer edge of a trailer of a tractor-trailer along one side of a body of the vehicle;
   b) an adjustable base adjacent a distal end of said first housing;
   c) a linear actuator within said first housing having a shaft extending through said distal end of said first housing for supporting said adjustable base;
   d) said linear actuator comprising a threaded ball screw connected at a distal end thereof to a proximal end of said shaft within said first housing, a cover enclosing said screw, a ball nut interlocked to said cover to prevent rotation of said ball nut, said ball nut threadably engaged with said screw so that said ball nut moves linearly along said screw when said screw is rotated, so that movement of said ball nut along said screw causes said shaft to either extend or retract depending on direction of rotation of said screw;
   e) an electric motor and gear assembly mounted in a proximal end of said first housing for driving said screw in one direction to extend said adjustable base, or an opposite direction to retract said adjustable base;
   f) an electrical controller for controlling the operation of said linear actuator using said electric motor and gear assembly;
   g) a backup light mounted on said adjustable base; and
   h) wherein said shaft extends from said linear actuator laterally from said body when a driver of said vehicle activates said backup light for illuminating a rear area while said vehicle is backing up.

2. The backup light system of claim 1, wherein said backup light system uses sustaining motion control.

3. The backup light system of claim 2, in which said backup light is pivotally mounted on said bracket to permit positional adjustment of said backup light.

4. The backup light system of claim 3, in which said first housing is located in front of rear wheels of said vehicle.

5. The backup light system of claim 4, having a second housing identical to said first housing mounted on an opposite side of said vehicle so that surrounding rear areas on both sides of said vehicle are illuminated while said vehicle is backing up.

6. The backup light system of claim 2, in which said vehicle is selected from the group consisting of a truck and a trailer.

7. The backup light system of claim 1, wherein said backup light system is hardwired.

8. The backup light system of claim 1, wherein said backup light system is wireless.

9. The backup light system of claim 1, wherein said backup light system uses momentary motion control.

10. A method of illuminating the surrounding rear areas of a vehicle while backing up, comprising the steps of:
    a) mounting a laterally extending first housing underneath an outer edge of a trailer of a tractor-trailer and along one side of said trailer;
    b) providing an adjustable base adjacent a distal end of the first housing;
    c) providing a linear actuator within the first housing having a shaft extending through end of the first housing for supporting said adjustable base;
    d) said linear actuator comprising a threaded ball screw connected at a distal end thereof to a proximal end of said shaft within said first housing, a cover enclosing said screw, a ball nut interlocked to said cover to prevent rotation of said ball nut, said ball nut threadably engaged with said screw so that said ball nut moves linearly along said screw when said screw is rotated, so that movement of said ball nut along said screw causes said shaft to either extend or retract depending on direction of rotation of said screw;
    e) providing an electric motor and gear assembly mounted in a proximal end of said first housing for driving said screw in one direction to extend said adjustable base, or an opposite direction to retract said adjustable base;
    f) controlling the operation of the linear actuator with an electrical controller;
    g) mounting the backup light on said adjustable base; and
    h) a driver of said tractor-trailer shifts to reverse causing said shaft to extend from the linear actuator laterally and activates the backup light for illuminating a rear area while the vehicle is backing up.

11. The method of claim 10, wherein the backup light system is hardwired.

12. The method of claim 11, further comprising the step of controlling the operation of the linear actuator with a hardwired switch.

13. The method of claim 10, wherein the backup light system is wireless.

14. The method of claim 13, further comprising the step of controlling the operation of the linear actuator with a wireless remote control.

15. The method of claim 10, wherein the backup light system uses momentary motion control.

16. The method of claim 10, wherein the backup light system uses sustaining motion control.

17. The method of claim 10, further comprising the step of pivotally adjusting the backup light on the adjustable base.

18. The method of claim 10, in which the vehicle is selected from the group consisting of a truck and a trailer.

19. The method of claim 10, in which the first housing is located in front of rear wheels of the vehicle.

20. The method of claim 10, having a second housing identical to the first housing mounted on an opposite side of the vehicle so that surrounding rear areas on both sides of the vehicle are illuminated while the vehicle is backing up.

\* \* \* \* \*